(No Model.)

W. A. CROWDUS.
ELECTRIC MOTOR.

No. 511,758. Patented Jan. 2, 1894.

Witnesses:
R. J. Jacker,
Flora L. Brown

Inventor:
Walter A. Crowdus,
By Charles Turner Brown,
Atty.

UNITED STATES PATENT OFFICE.

WALTER A. CROWDUS, OF CHICAGO, ILLINOIS.

ELECTRIC MOTOR.

SPECIFICATION forming part of Letters Patent No. 511,758, dated January 2, 1894.

Application filed October 11, 1892. Serial No. 448,521. (No model.)

*To all whom it may concern:*

Be it known that I, WALTER A. CROWDUS, of the city of Chicago, in the county of Cook and State of Illinois, have invented a certain new and useful Improvement in Electric Motors, of which the following, when taken in connection with the drawings accompanying and forming a part hereof, is a full and complete description, sufficient to enable those skilled in the art to understand, make, and use the same.

The object of my invention is to obtain an electric motor which can be constructed at small cost, having few parts readily secured together, and a motor which can be used when placed in more than one position to actuate different kinds of machines or machinery, as a fan sewing machine or other devices; and my invention consists in the manner of constructing the several parts and combining the same in order to build up a motor embodying my inventions.

Figure 1:
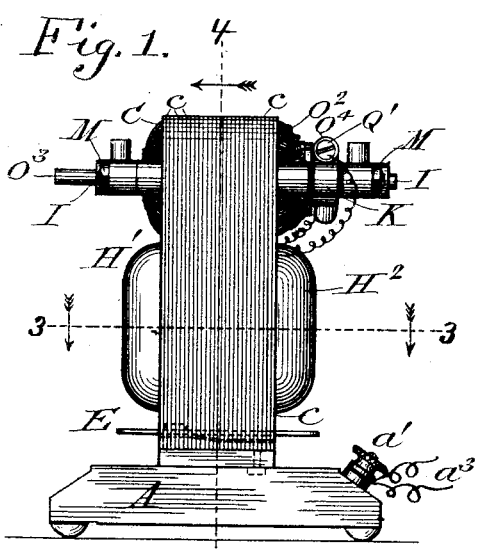
Figure 2:
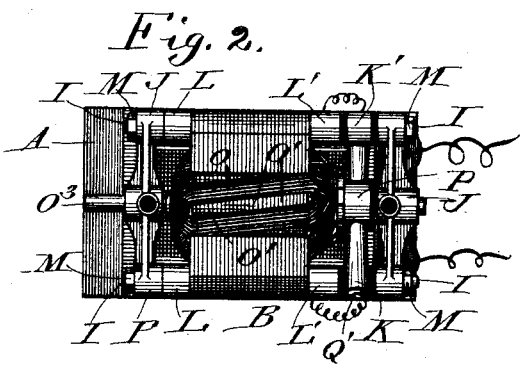
Figure 3:
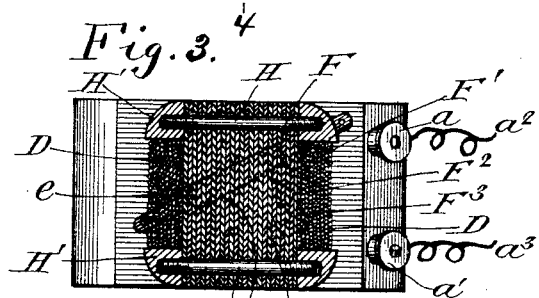
Figure 4:
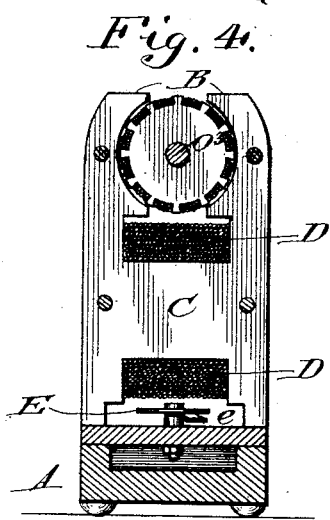
Figure 5:
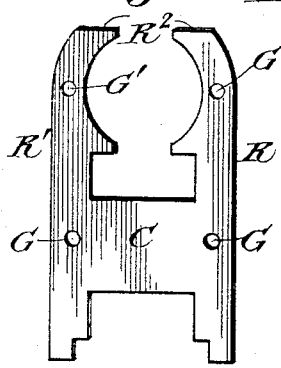
Figure 6:
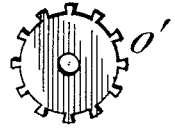
Figure 7:
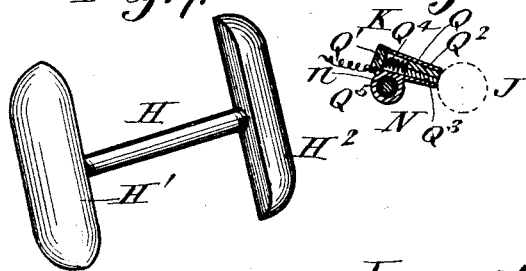

In the drawings referred to—Figure 1 is a side elevation of a motor embodying my inventions; Fig. 2, a top plan view thereof; Fig. 3, a sectional view on line 3—3 of Fig. 1, viewed in the direction indicated by the arrows; Fig. 4, a sectional view on line 4—4 of Fig. 1, also viewed in the direction indicated by the arrows; Fig. 5, an elevation of a plate used in building up the field magnets of the motor; Fig. 6, an elevation of a plate used in building up the armature of the motor; Fig. 7, a perspective view of a rod and the ends thereon used in building up the motor; and Fig. 8, a vertical cross-sectional view of the brush-holder and brush forming a part of the motor.

The same letter of reference is used to indicate a given part where more than one view thereof is shown in the several figures of the drawings.

A, is the base of the motor.

$a, a'$, are the binding posts forming terminals for the line wire of the circuit over which the current extends, whereby the motor is actuated; and $a^2, a^3$, are the line wires of the circuit.

B, B, are the field magnets of the motor; and C, is a sheet metal plate entering into the construction of the field magnets B, B.

D, is the field coil whereby magnetism of the field magnets B, B, is obtained. Field coil D is a compound wound coil, as it is termed in the art, but no invention is claimed by me in such winding.

E, is a switch pivoted on post $e$, adapted to be turned on such post $e$ so as to be brought into electrical contact, respectively, with posts $F, F', F^2, F^3$ and $F^4$. Switch E is in electrical connection with post $e$, and post $e$ is electrically connected with one of the binding posts $a, a'$. When the switch E is in electrical contact with post F as indicated by the dotted lines in Fig. 3, the line circuit is broken and the motor is at rest. The several posts $F', F^2, F^3, F^4$, are, respectively, connected with field coil D, in the ordinary manner of connecting terminals with a compound wound field coil, so that when the switch E is in electrical contact with the post $F'$, the field magnets B, B, are magnetized, as well as the armature, as will be hereinafter described, and the motor is thereby actuated as a straight shunt wound motor, and the coils of which $F^2$, $F^3$ and $F^4$, are the terminals are entirely cut out of circuit, and when such switch E is in contact with post $F^2$, field magnets B, B, are magnetized to a greater extent, and the armature to a less extent and the speed of the motor is thereby decreased. When switch E is in electrical contact with post $F^3$ and $F^4$, respectively, field magnets B, B, are magnetized to a yet greater extent and the armature still less. The manner in which the coil D is compound wound, is as stated by me, no part of my invention, and such winding is therefore not fully shown.

G, G, G', G', (Fig. 5,) are holes in plate C.

H, H, are rods extending through holes G, G; and I, I, are rods extending through holes G', G', respectively. By means of rods H, H, and I, I, plates C are held firmly in position in constructing field magnets B, B.

$H', H^2$, are nuts threaded on rod H, such nuts being adapted to be adjusted closely against the outer ones of the plates C. The nuts $H', H^2$, respectively, are also adapted, as is fully illustrated in Figs. 1 and 3, to serve as guards for the field coil D, and do serve as such guards maintaining such field coil in proper position, protecting them from displacement or injury. Rods I, I, serve in addition to the purposes hereinbefore named, of maintaining the plates C in position in the field magnet, as the base on which are mounted, respectively, journal bearings J, J, in which the armature of the motor rotates, and brush-holders K, K′, respectively.

L, L′, are washers threaded on rods I, I, respectively, between the journal bearings J, J, respectively, and the outer ones of the plates C forming the field magnets B, B.

M, M, are nuts constructed in the ordinary way adapted to be adjustably secured against the journal bearings J, J, respectively, and to thereby firmly hold in position the journal bearings J, J, brush-holders K, K′, washers L, L, and L′, L′, and plates C, C, C. Brush-holders K, K′, are duplicates in construction and are each insulated from the rod I on which they are, respectively, placed, by insulating the material N. The armature O is wound in the ordinary manner, and consists of a series of plates O′, O′, (Fig. 6,) having wound thereon coil $O^2$, and is mounted on shaft $O^3$, such shaft being rotatably held in the journal bearings J, J, respectively. P, is the commutator of the armature, against which commutator, the brushes contained in brush-holders K, K′, are held in electrical contact.

Figure 8:
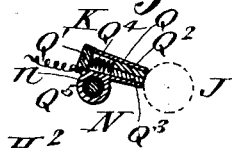

The construction of the brush-holder K is clearly illustrated in Fig. 8 of the drawings, and consists of the tube Q, having adjustable plug Q′ at the outer end thereof, brushes $Q^2$, and $Q^3$ at the inner end thereof, and spring $Q^4$ abutting against the adjustable plug Q′ at one end, and the inner end of the brushes $Q^2$, $Q^3$, respectively, at the other end, such spring $Q^4$ being contained within the tube Q and an abutment $Q^5$ within which abutment is placed the insulating material N having the circular hole $n$ therein, through which the rod I extends, as hereinbefore described.

In securing the brush-holder K in place on the rod I, as hereinbefore described, and by the tightening of the nuts M, M, respectively, the holder is held rigidly in position, and the brushes $Q^2$, $Q^3$, are forced against the commutator J by the adjusting of the plug Q′ against the spring $Q^4$. As will be observed by inspection of Fig. 8, the commutator brushes $Q^2$, $Q^3$, consists of a pencil, preferably of some metal, divided by a horizontal cut into two half pencils, the purpose being to obviate as much as possible the liability to breakage of electrical contact of the brushes with the commutator in the operation of the machine.

In a motor, constructed as herein described, such motor can be used, when standing, on the base A, as illustrated in Fig. 1, or such motor can be placed upon the sides thereof corresponding with the sides lettered R, R′, of plate C, or upon the end of the motor formed by the end $R^2$ of the plate C. (See Fig. 5.)

Having thus described my invention, what I claim as new, and desire to secure by Letters Patent, is—

1. In an electric motor, a field magnet consisting of sheet metal plates extending in parallel planes, a field coil extending around the plates, holes in the plates adapted to have bolts extended therethrough, bolts extending through the holes and a nut adapted to fit on each end of the respective bolts and hold the plates together, and at the same time, form a guard for the field coil; substantially as described.

2. In an electric motor, the combination of a field magnet having bolt holes therethrough, brush holders consisting respectively, of a barrel having an abutment thereon, with a hole extending through such abutment, bolts extending, respectively through the holes in the field magnet and also through the hole in the abutment of the brush holders, respectively, and insulating material interposed between the brush holders, respectively and the bolts attaching them to the field magnet; whereby the brush holders are, respectively rigidly secured in position and to the field magnets; substantially as described.

3. In an electric motor, the combination of field magnets constructed of sheet metal plates, each thereof having holes therethrough, bolts adapted to extend through the respective holes, nuts fitting on each end of the lower two of such bolts, and holding the plates in position, and also forming guards for the field coil, bolts extending through the upper two of the holes in the plates, commutator brush-holders, one thereof mounted on each one of the last named bolts at the end thereof adjacent to the commutator of the armature, journal bearings wherein the armature shaft is rotatably mounted, placed, respectively, on the ends of such bolts, and nuts on the bolts adapted to be adjustably fitted against the journal bearings, whereby the journal bearing, commutator brush-holders and the plates forming the field magnet, are firmly secured together; substantially as described.

4. In an electric motor, the combination of field magnets constructed of sheet metal plates each thereof having holes therethrough, bolts adapted to extend through the respective holes, nuts fitting on each end of the lower two of such bolts, and holding the plates in position, and also forming guards for the field coil, bolts extending through the upper two of the holes in the plates, commutator brush-holders one thereof mounted on each one of the last named bolts at the end thereof, adjacent to the commutator of the armature, journal bearings wherein the armature shaft is rotatably mounted, placed, respectively, on the ends of such bolts, and nuts on the bolts adapted to be adjustably fitted against the journal bearings, whereby the journal bearings, commutator brush-holders, and the plates forming the field magnet are firmly secured together, each of such plates having parallel ends and sides on the edges thereof, and such journal bearings and commutator brush-holders not extending, when secured in position, beyond the edges of the plates forming the field magnet whereby the motor can be actuated, when placed on either end or side thereof; substantially as described.

WALTER A. CROWDUS.

Witnesses:
CHARLES TURNER BROWN,
FLORA L. BROWN.